United States Patent
Hori et al.

(10) Patent No.: US 12,151,303 B2
(45) Date of Patent: *Nov. 26, 2024

(54) METHOD FOR MANUFACTURING LIQUID-COOLING JACKET AND FRICTION STIR WELDING METHOD

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 17/793,897

(22) PCT Filed: Mar. 26, 2020

(86) PCT No.: PCT/JP2020/013865
§ 371 (c)(1),
(2) Date: Jul. 19, 2022

(87) PCT Pub. No.: WO2021/149273
PCT Pub. Date: Jul. 29, 2021

(65) Prior Publication Data
US 2023/0135888 A1    May 4, 2023

(30) Foreign Application Priority Data
Jan. 24, 2020 (JP) .................................. 2020-010354

(51) Int. Cl.
*B23K 20/00* (2006.01)
*B23K 20/12* (2006.01)
*B23K 103/10* (2006.01)

(52) U.S. Cl.
CPC .......... *B23K 20/129* (2013.01); *B23K 20/124* (2013.01); *B23K 20/1245* (2013.01); *B23K 2103/10* (2018.08)

(58) Field of Classification Search
CPC .............. B23K 20/1255; B23K 20/126; B23K 2101/14; B23K 20/122; B23K 20/1265;
(Continued)

(56) References Cited

U.S. PATENT DOCUMENTS 6,191,383 B1 * 2/2001 Jense .................... F28D 1/0308
219/79
6,325,273 B1 * 12/2001 Boon ....................... B41J 2/325
228/2.1

(Continued)

FOREIGN PATENT DOCUMENTS

| JP | 2003-48084 A | 2/2003 |
| JP | 2015-131321 A | 7/2015 |

(Continued)

OTHER PUBLICATIONS

International Search Report for and Written Opinion for PCT/JP2020/013865 (May 26, 2020).

*Primary Examiner* — Erin B Saad
(74) *Attorney, Agent, or Firm* — Merchant & Gould P.C.

(57) ABSTRACT

The present invention includes: a primary joining process in which a coarse portion having a predetermined width is formed in the vicinity of a step side face within a plasticized region while the rotary tool is being moved one round along a first butted portion to perform friction stirring in a state that a tip of a stirring pin of a rotary tool being rotated is inserted to the same depth as or slightly deeper than a step bottom face and a bottom face of a shoulder portion is in contact with a front face of a sealing body and the stirring pin is slightly in contact with at least an upper portion of a jacket body; and an inspection process in which a passed position (Continued)

of the stirring pin is specified by performing, after the primary joining process, a flaw detection to detect the coarse portion.

4 Claims, 10 Drawing Sheets

(58) Field of Classification Search
CPC ............ B23K 20/129; B23K 2101/045; B23K 2103/10; B23K 20/1225; B23K 20/1235; B23K 20/123; B23K 20/124; B23K 2101/36; B23K 20/12; B23K 20/2336; B23K 2101/04; B23K 2101/18; B23K 2103/18; B23K 20/1245; B23K 20/127; B23K 20/227; B23K 20/24; B23K 2101/06; B23K 2103/05; B23K 31/125; B23K 33/006; B23K 37/0235; B23K 37/0531

See application file for complete search history.

(56) References Cited

U.S. PATENT DOCUMENTS

| | | | | |
|---|---|---|---|---|
| 6,676,004 | B1* | 1/2004 | Trapp | B23K 20/1255 228/2.1 |
| 7,275,675 | B1* | 10/2007 | Carter | B23K 20/1255 228/2.1 |
| 7,494,040 | B2* | 2/2009 | Babb | B23K 20/227 228/2.1 |
| 7,857,192 | B2* | 12/2010 | Nagano | B23K 20/1255 228/2.1 |
| 8,434,661 | B2* | 5/2013 | Hovanski | B23K 20/1255 228/2.1 |
| 11,059,125 | B2* | 7/2021 | Rosal | B23K 20/1255 |
| 2002/0027155 | A1* | 3/2002 | Okamura | B23K 20/124 228/2.1 |
| 2004/0084506 | A1* | 5/2004 | Tanaka | B23K 20/122 228/2.1 |
| 2005/0011933 | A1* | 1/2005 | Grong | B21C 23/005 228/165 |
| 2005/0246884 | A1* | 11/2005 | Chen | B23K 33/004 29/525 |
| 2006/0151576 | A1* | 7/2006 | Akiyama | B23K 20/123 228/112.1 |
| 2007/0119276 | A1* | 5/2007 | Liu | C22C 29/16 75/232 |
| 2007/0241163 | A1* | 10/2007 | Valant | B23K 37/0235 228/2.1 |
| 2008/0154423 | A1* | 6/2008 | Badarinarayan | B23K 20/123 700/175 |
| 2008/0311421 | A1* | 12/2008 | Watson | B23K 20/122 428/654 |
| 2009/0065178 | A1* | 3/2009 | Kasezawa | H01L 23/473 165/104.19 |
| 2009/0108173 | A1* | 4/2009 | Kakui | B23K 26/03 250/202 |
| 2010/0101768 | A1* | 4/2010 | Seo | B23K 20/1225 29/890.038 |
| 2010/0159265 | A1* | 6/2010 | Fairchild | C22C 38/04 219/137 R |
| 2011/0308059 | A1* | 12/2011 | Seo | B23P 15/26 29/428 |
| 2012/0118937 | A1* | 5/2012 | Enzaka | B23K 20/1235 228/2.1 |
| 2015/0007912 | A1* | 1/2015 | Fujii | B23K 20/122 148/508 |
| 2016/0228981 | A1* | 8/2016 | Matsushita | B23K 20/1235 |
| 2016/0325374 | A1* | 11/2016 | Hori | B23K 20/1235 |
| 2017/0266754 | A1 | 9/2017 | Kato et al. | |
| 2018/0141152 | A1 | 5/2018 | Hori et al. | |
| 2018/0243858 | A1* | 8/2018 | Hori | B23K 20/1225 |
| 2018/0264584 | A1 | 9/2018 | Hori et al. | |
| 2018/0272479 | A1* | 9/2018 | Hori | B23K 20/1265 |
| 2019/0358740 | A1* | 11/2019 | Hori | B23K 20/122 |
| 2020/0147718 | A1* | 5/2020 | Hori | B23K 20/1255 |
| 2020/0324365 | A1* | 10/2020 | Hori | B23K 20/122 |
| 2021/0053144 | A1* | 2/2021 | Hori | B23P 15/26 |

FOREIGN PATENT DOCUMENTS

| | | |
|---|---|---|
| WO | 2016/056341 A1 | 4/2016 |
| WO | 2019/082439 A1 | 5/2019 |
| WO | 2019/193778 A1 | 10/2019 |

* cited by examiner

METHOD FOR MANUFACTURING LIQUID-COOLING JACKET AND FRICTION STIR WELDING METHOD

This application is a National Stage Application of PCT/JP2020/013865, filed Mar. 26, 2020, which claims benefit of priority to Japanese Application No. 2020-010354, filed Jan. 24, 2020, and which applications are incorporated herein by reference. To the extent appropriate, a claim of priority is made to each of the above disclosed applications.

TECHNICAL FIELD

The present invention relates to a method for manufacturing a liquid-cooling jacket and a friction stir welding method.

BACKGROUND ART

A method for manufacturing a liquid-cooling jacket utilizing friction stir welding is performed. For example, Patent Literature 1 discloses a method for manufacturing a liquid-cooling jacket. FIG. 12 is a cross sectional view showing a conventional method for manufacturing a liquid-cooling jacket. In the conventional method for manufacturing a liquid-cooling jacket, friction stir welding is performed to a butted portion J10 where a side face 102c of a sealing body 102 made of an aluminum alloy is butted against a step side face 101c of a stepped portion of a jacket body 101 made of an aluminum alloy. Further, in the conventional method for manufacturing a liquid-cooling jacket, friction stir welding is performed in a state that only a stirring pin FD2 of a rotary tool FD is inserted in the butted portion J10. Furthermore, in the conventional method for manufacturing a liquid-cooling jacket, the rotary tool FD is relatively moved in a state that a rotation axis XA of the rotary tool FD overlaps with the butted portion J10.

CITATION LIST

Patent Literature

Patent Literature 1: JP 2015-131321 A

SUMMARY OF INVENTION

Technical Problem

In general, the jacket body 101 tends to have a complex shape, so, for example, in some cases, the jacket body 101 is made of a casting material of a 4000 series aluminum alloy, and a member having a relatively simple shape such as the sealing body 102 is made of an expansible material of a 1000 series aluminum alloy. Thus, in some cases, a liquid-cooling jacket is manufactured by joining members made of different kinds of aluminum alloys together. In such cases, in general, the jacket body 101 has a higher hardness than the sealing body 102. Hence, in a case where friction stir welding is performed in such a manner as that shown in FIG. 12, the material resistance to the stirring pin FD2 to receive from the jacket body 101 is larger than that to receive from the sealing body 102. As the result, it is difficult to stir different kinds of materials with good balance by the stirring pin FD2 of the rotary tool FD, so that there exists a problem that a cavity defect is caused in a plasticized region formed by joining to reduce the joint strength.

Further, after a liquid-cooling jacket is manufactured, in some cases, quality control of the liquid-cooling jacket is performed, for example, by ultrasonic flaw detection. In this inspection, the presence or absence of poor joining can be detected by the ultrasonic flaw detection. However, there is a problem that it is not possible to know where the rotary tool has passed.

From such a view point, it is an object of the present invention to provide a method for manufacturing a liquid-cooling jacket and a friction stir welding method, the methods being capable of appropriately joining different kinds of aluminum alloys and knowing where the rotary tool has passed.

Solution to Problem

In order to solve the problem, the present invention is characterized by a method for manufacturing a liquid-cooling jacket, in which a jacket body provided with a bottom portion and a peripheral wall portion rising from a peripheral edge of the bottom portion, and a sealing body to seal an opening portion of the jacket body are friction stir welded, wherein the jacket body is made of a material harder than the sealing body, wherein a rotary tool used for friction stirring is provided with a shoulder portion and a stirring pin hanging down from a center of a bottom face of the shoulder portion, and wherein an outer circumferential face of the stirring pin is inclined to have a smaller diameter with increasing distance toward a tip thereof, the method comprising: a preparation process in which a peripheral wall stepped portion having a step bottom face and a step side face is formed along an inner peripheral edge of the peripheral wall portion, the step side face rising from the step bottom face toward the opening portion; a placing process in which by placing the sealing body on the jacket body, a first butted portion is formed so that the step side face of the peripheral wall stepped portion and an outer peripheral side face of the sealing body are butted against each other, and a second butted portion is formed so that the step bottom face overlaps with a back face of the sealing body; a primary joining process in which a coarse portion having a predetermined width is formed in the vicinity of the step side face within a plasticized region while the rotary tool is being moved one round along the first butted portion to perform friction stirring in a state that the tip of the stirring pin of the rotary tool being rotated is inserted to the same depth as or slightly deeper than the step bottom face and the bottom face of the shoulder portion is in contact with the sealing body and the stirring pin is slightly in contact with at least an upper portion of the jacket body; and an inspection process in which a passed position of the stirring pin is specified by performing, after the primary joining process, a flaw detection to detect the coarse portion.

According to this manufacturing method, the metal of the sealing body in the first butted portion is mainly stirred to be plastically fluidized because of the frictional heat between the sealing body and the stirring pin, so that the step side face and an outer peripheral side face of the sealing body can be joined together in the first butted portion. Further, since friction stirring is performed in a state that the bottom face of the shoulder portion is in contact with the front face of the sealing body and the stirring pin is slightly in contact with at least the upper portion of the step side face of the jacket body, metal mixing into the sealing body from the jacket body can be reduced as much as possible while ensuring the joint strength. Hereby, the metal of the sealing body is mainly frictionally stirred in the first butted portion, so that lowering of the joint strength can be suppressed.

Further, since the stirring pin is inserted to the same depth as or slightly deeper than the step bottom face, metal mixing into the sealing body from the jacket body can be reduced as much as possible while enhancing the joint strength of the second butted portion. Furthermore, by deliberately forming the coarse portion having the predetermined width, the passed position of the stirring pin can be detected through flaw detection. Hereby, the quality control work can be more easily performed.

Further, the present invention is characterized by a method for manufacturing a liquid-cooling jacket, in which a jacket body provided with a bottom portion and a peripheral wall portion rising from a peripheral edge of the bottom portion, and a sealing body to seal an opening portion of the jacket body are friction stir welded, wherein the jacket body is made of a material harder than the sealing body, wherein a rotary tool used for friction stirring is provided with a shoulder portion and a stirring pin hanging down from a center of a bottom face of the shoulder portion, and wherein an outer circumferential face of the stirring pin is inclined to have a smaller diameter with increasing distance toward a tip thereof, the method comprising: a preparation process in which a peripheral wall stepped portion having a step bottom face and a step side face is formed along an inner peripheral edge of the peripheral wall portion, the step side face rising from the step bottom face toward the opening portion, and the sealing body is formed to have a thickness larger than a height dimension of the step side face of the peripheral wall stepped portion; a placing process in which by placing the sealing body on the jacket body, a first butted portion is formed so that the step side face of the peripheral wall stepped portion and an outer peripheral side face of the sealing body are butted against each other, and a second butted portion is formed so that the step bottom face overlaps with a back face of the sealing body; a primary joining process in which a coarse portion having a predetermined width is formed in the vicinity of the step side face within a plasticized region while the rotary tool is being moved one round along the first butted portion to perform friction stirring in a state that the tip of the stirring pin of the rotary tool being rotated is inserted to the same depth as or slightly deeper than the step bottom face and the bottom face of the shoulder portion is in contact with the sealing body and the stirring pin is slightly in contact with at least an upper portion of the jacket body; and an inspection process in which a passed position of the stirring pin is specified by performing, after the primary joining process, a flaw detection to detect the coarse portion.

According to this manufacturing method, the metal of the sealing body in the first butted portion is mainly stirred to be plastically fluidized because of the frictional heat between the sealing body and the stirring pin, so that the step side face and an outer peripheral side face of the sealing body can be joined together in the first butted portion. Further, since friction stirring is performed in a state that the bottom face of the shoulder portion is in contact with the front face of the sealing body and the stirring pin is slightly in contact with at least the upper portion of the step side face of the jacket body, metal mixing into the sealing body from the jacket body can be reduced as much as possible while ensuring the joint strength. Hereby, the metal of the sealing body is mainly frictionally stirred in the first butted portion, so that lowering of the joint strength can be suppressed.

Further, since the stirring pin is inserted to the same depth as or slightly deeper than the step bottom face, metal mixing into the sealing body from the jacket body can be reduced as much as possible while enhancing the joint strength of the second butted portion. Furthermore, by deliberately forming the coarse portion having the predetermined width, the passed position of the stirring pin can be detected through flaw detection. Hereby, the quality control work can be more easily performed. Metal shortage of the joined portion can be prevented by enlarging the thickness of the sealing body.

Furthermore, the present invention is characterized by a method for manufacturing a liquid-cooling jacket, in which a jacket body provided with a bottom portion and a peripheral wall portion rising from a peripheral edge of the bottom portion, and a sealing body to seal an opening portion of the jacket body are friction stir welded, wherein the jacket body is made of a material harder than the sealing body, wherein a rotary tool used for friction stirring is provided with a shoulder portion and a stirring pin hanging down from a center of a bottom face of the shoulder portion, and wherein an outer circumferential face of the stirring pin is inclined to have a smaller diameter with increasing distance toward a tip thereof, the method comprising: a preparation process in which a peripheral wall stepped portion having a step bottom face and a step side face is formed along an inner peripheral edge of the peripheral wall portion, the step side face obliquely rising from the step bottom face toward the opening portion to spread, and the sealing body is formed to have a thickness larger than a height dimension of the step side face of the peripheral wall stepped portion; a placing process in which by placing the sealing body on the jacket body, a first butted portion is formed to have a gap between the step side face of the peripheral wall stepped portion and an outer peripheral side face of the sealing body, and a second butted portion is formed so that the step bottom face overlaps with a back face of the sealing body; a primary joining process in which a coarse portion having a predetermined width is formed in the vicinity of the step side face within a plasticized region while the rotary tool is being moved one round along the first butted portion to perform friction stirring in a state that the tip of the stirring pin of the rotary tool being rotated is inserted to the same depth as or slightly deeper than the step bottom face and the bottom face of the shoulder portion is in contact with the sealing body and the stirring pin is slightly in contact with at least an upper portion of the jacket body; and an inspection process in which a passed position of the stirring pin is specified by performing, after the primary joining process, a flaw detection to detect the coarse portion.

According to this manufacturing method, the metal of the sealing body in the first butted portion is mainly stirred to be plastically fluidized because of the frictional heat between the sealing body and the stirring pin, so that the step side face and an outer peripheral side face of the sealing body can be joined together in the first butted portion. Further, since friction stirring is performed in a state that the bottom face of the shoulder portion is in contact with the front face of the sealing body and the stirring pin is slightly in contact with at least the upper portion of the step side face of the jacket body, metal mixing into the sealing body from the jacket body can be reduced as much as possible while ensuring the joint strength. Hereby, the metal of the sealing body is mainly frictionally stirred in the first butted portion, so that lowering of the joint strength can be suppressed.

Further, since the stirring pin is inserted to the same depth as or slightly deeper than the step bottom face, metal mixing into the sealing body from the jacket body can be reduced as much as possible while enhancing the joint strength of the second butted portion. Furthermore, by deliberately forming the coarse portion having the predetermined width, the passed position of the stirring pin can be detected through flaw detection. Hereby, the quality control work can be more easily performed. Further, by forming both of the outer circumferential face of the stirring pin and the step side face to be inclined, it can be avoided that the stirring pin and the step side face largely come into contact with each other. Furthermore, metal shortage of the joined portion can be prevented by enlarging the thickness of the sealing body.

It is preferable that the sealing body is made of an aluminum wrought alloy material and the jacket body is made of an aluminum alloy casting material.

It is preferable that the rotary tool is rotated clockwise in a case where the stirring pin of the rotary tool has a spiral groove in the outer circumferential face thereof, the spiral groove being counterclockwise with increasing distance from a base toward the tip thereof, and that the rotary tool is rotated counterclockwise in a case where the stirring pin of the rotary tool has a spiral groove in the outer circumferential face thereof, the spiral groove being clockwise with increasing distance from a base toward the tip thereof.

Hereby, the plastically fluidized metal is led toward the tip side of the stirring pin through the spiral groove, so that the occurrence of burrs can be reduced.

It is preferable that in the primary joining process, a rotational direction and an advancing direction of the rotary tool are set so that within the plasticized region to be formed at a moving trace of the rotary tool, a jacket body side is an advancing side and a sealing body side is a retreating side.

Hereby, the jacket body side is set to be an advancing side and the stirring action around the first butted portion by the stirring pin is enhanced, so that rising of the temperature at the first butted portion is expected, and the step side face and the outer peripheral side face of the sealing body can be more firmly joined together at the first butted portion.

Furthermore, the present invention is characterized by a friction stir welding method in which a first member and a second member are joined together with use of a rotary tool, wherein the first member is made of a material harder than the second member, wherein the rotary tool used for friction stirring is provided with a shoulder portion and a stirring pin hanging down from a center of a bottom face of the shoulder portion, and wherein an outer circumferential face of the stirring pin is inclined to have a smaller diameter with increasing distance toward a tip thereof, the method comprising: a preparation process in which a step portion having a step bottom face and a step side face rising from the step bottom face is formed in the first member; a placing process in which by placing the second member on the first member, a first butted portion is formed so that the step side face of the step portion and a side face of the second member are butted against each other, and a second butted portion is formed so that the step bottom face overlaps with a back face of the second member; a primary joining process in which a coarse portion having a predetermined width is formed in the vicinity of the step side face within a plasticized region while the rotary tool is being moved one round along the first butted portion to perform friction stirring in a state that the tip of the stirring pin of the rotary tool being rotated is inserted to the same depth as or slightly deeper than the step bottom face and the bottom face of the shoulder portion is in contact with a front face of the second member and the stirring pin is slightly in contact with at least an upper portion of the first member; and an inspection process in which a passed position of the stirring pin is specified by performing, after the primary joining process, a flaw detection to detect the coarse portion.

Advantageous Effects of Invention

According to the method for manufacturing a liquid-cooling jacket and the friction stir welding method according to the present invention, different kinds of metals can be appropriately joined together and it is possible to know where the rotary tool has passed.

DESCRIPTION OF EMBODIMENTS

Figure 1:
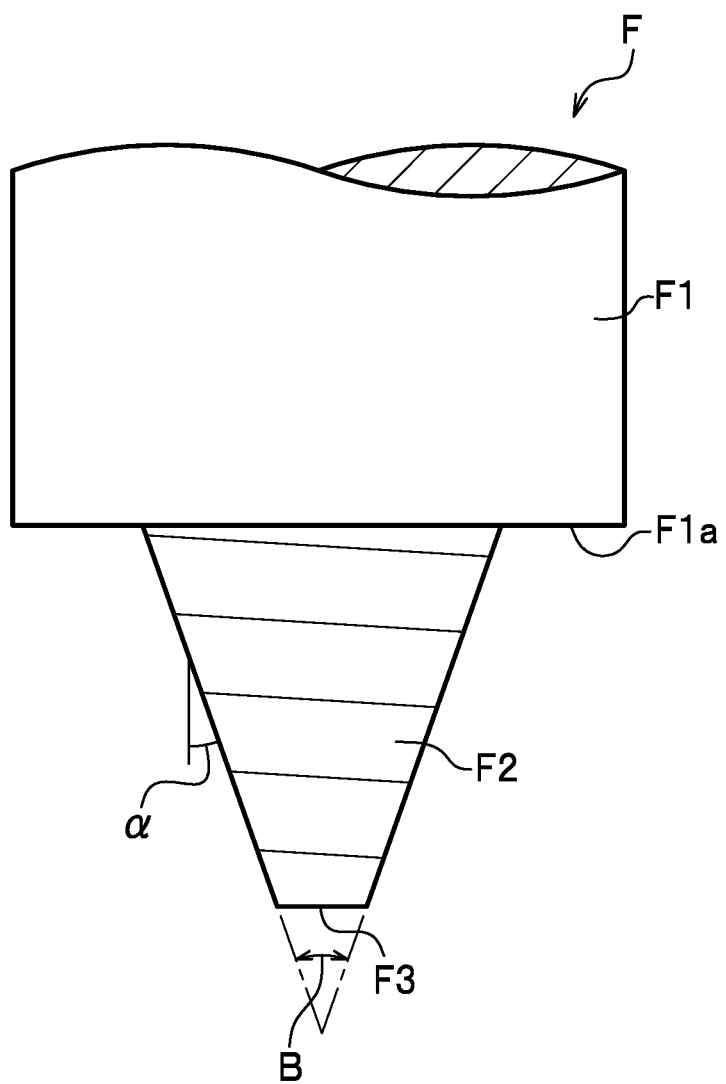
FIG. 1 is a side view showing a rotary tool according to one embodiment of the present invention.

An embodiment of the present invention will be described with reference to the drawings where appropriate. First, a rotary tool which is used in a welding method according to the present embodiment will be described. The rotary tool is a tool to be used for friction stir welding. As shown in FIG. 1, a rotary tool F is made of, for example, tool steel, and is mainly formed of a shoulder portion F1 and a stirring pin F2. A bottom face F1a of the shoulder portion F1 is a portion for pressing plastically fluidized metal. The shoulder portion F1 has a cylindrical shape.

The stirring pin F2 hangs down from a center of the bottom face F1a of the shoulder portion F1, and is coaxial with the shoulder portion F1. The stirring pin F2 has a tapered shape such that the diameter thereof decreases with increasing distance from the shoulder portion F1 toward the tip. The stirring pin F2 has a spiral groove on an outer circumferential face thereof. In this embodiment, the spiral groove is formed to be counterclockwise from the base toward the tip because the rotary tool F is rotated clockwise.

It should be noted that in a case where the rotary tool F is rotated counterclockwise, the spiral groove is formed to be clockwise from the base toward the tip. This makes it possible to guide plastically fluidized metal generated by friction stir welding toward the tip side of the stirring pin F2 through the spiral groove. It is therefore possible to reduce the amount of metal to be leaked out of metal members to be joined together (jacket body 2 and sealing body 3).

In this embodiment, the rotary tool F is attached to the friction stir device capable of moving in the horizontal directions as well as in the vertical directions. It should be noted that the rotary tool F may be attached to a robot arm having a tip end equipped with a rotary drive means such as a spindle unit.

First Embodiment

Figure 2:
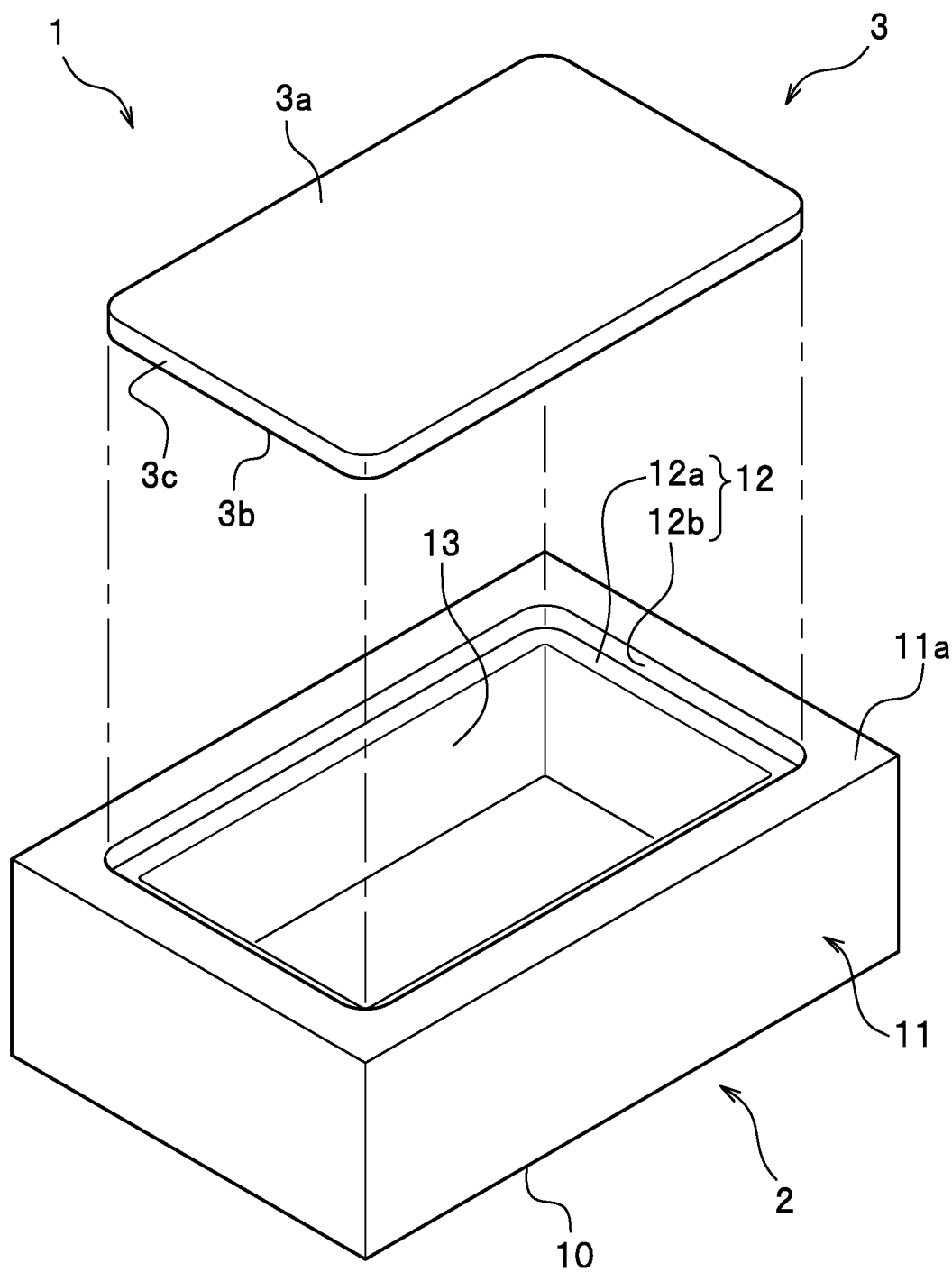
FIG. 2 is a perspective view showing a preparation process of a method for manufacturing a liquid-cooling jacket according to a first embodiment of the present invention.

A method for manufacturing a liquid-cooling jacket according to an embodiment of the present invention will be described in detail with reference to the drawings. As shown in FIG. 2, the method for manufacturing a liquid-cooling jacket 1 according to the embodiment of the present invention is a method where the liquid-cooling jacket 1 is manufactured by performing friction stir welding to a jacket body 2 and a sealing body 3. The liquid-cooling jacket 1 includes the sealing body 3, on which a heating element (not shown) is placed and inside which a fluid is allowed to flow to exchange heat with the heating element. It should be noted that, hereinafter, a "front face" means the face opposite to a "back face".

The method for manufacturing a liquid-cooling jacket according to this embodiment includes a preparation process, a placing process, a primary joining process and an inspection process. The preparation process is a process to prepare the jacket body 2 and the sealing body 3. The jacket body 2 is mainly composed of a bottom portion 10 and a peripheral wall portion 11. The jacket body 2 is made of a material mainly containing a first aluminum alloy. The first aluminum alloy is, for example, an aluminum alloy casting material such as JISH5302 ADC12 (based on Al—Si—Cu). The jacket body 2 is made of an aluminum alloy as an example in this embodiment, but may be made of another metal capable of being frictionally stirred.

Figure 3:
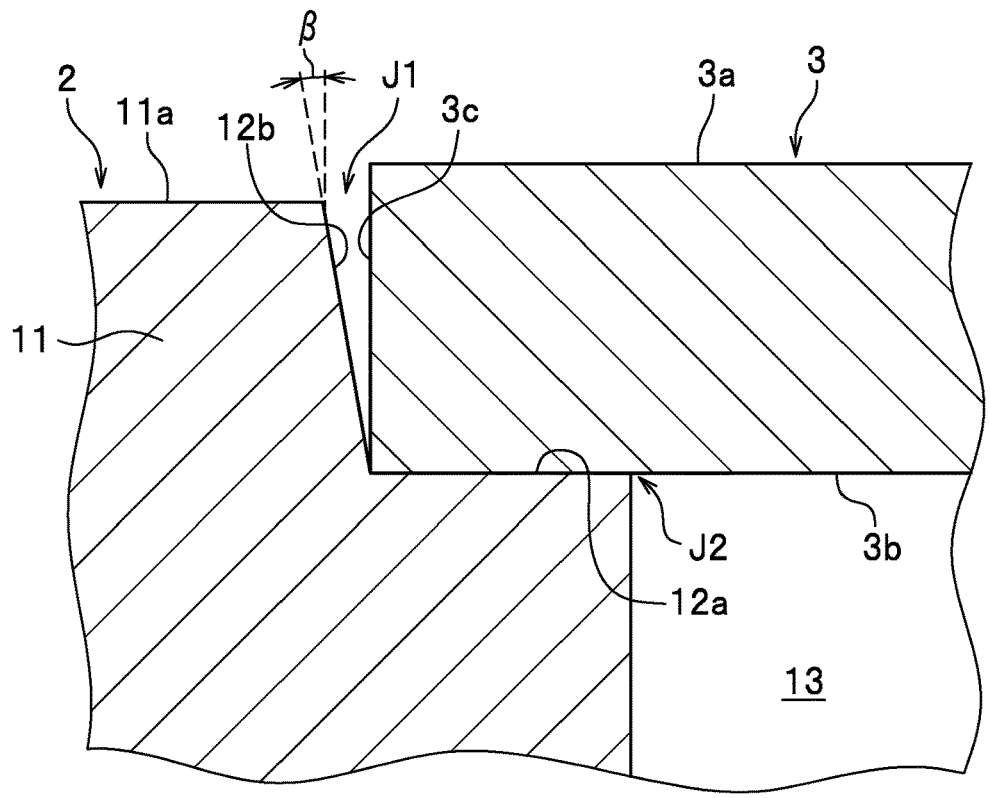
FIG. 3 is a cross sectional view showing a placing process of the method for manufacturing a liquid-cooling jacket according to the first embodiment.

As shown in FIG. 2, the bottom portion 10 is a plate-like member having a rectangular shape in a plan view. The peripheral wall portion 11 is a wall portion rising from the peripheral edge portion of the bottom portion 10 and having a rectangular frame shape. A peripheral wall stepped portion 12 is formed at an inner peripheral edge of the peripheral wall portion 11. The peripheral wall stepped portion 12 is composed of a step bottom face 12a and a step side face 12b rising from the step bottom face 12a. As shown in FIG. 3, the step side face 12b inclines to spread toward the outside with increasing distance from the step bottom face 12a and toward an opening portion. An inclination angle β of the step side face 12b with respect to the vertical plane may be appropriately set, and is set to, for example, 3° to 30° with respect to the vertical plane. A recessed portion 13 is defined by the bottom portion 10 and the peripheral wall portion 11. Here, the vertical plane is defined as a plane composed of an advancing vector of the rotary tool F and a vertical vector.

The sealing body 3 is a plate-like member to seal the opening portion of the jacket body 2. The sealing body 3 has a size capable of being placed on the peripheral wall stepped portion 12. A thickness of the sealing body 3 is larger than a height dimension of the step side face 12b. The thickness of the sealing body 3 is appropriately set so that a joined portion does not fall in shortage of metal when the primary joining process to be described later is performed. The sealing body 3 is made of a material mainly containing a second aluminum alloy. The second aluminum alloy has a hardness lower than the first aluminum alloy. The second aluminum alloy is, for example, an aluminum wrought alloy material such as JIS A1050, A1100, A6063. The sealing body 3 is made of an aluminum alloy as an example in this embodiment, but may be made of another metal capable of being frictionally stirred. It should be noted that the hardness in this description refers to Brinell hardness, which can be measured by a method in conformity with JIS Z 2243.

The placing process is a process to place the sealing body 3 on the jacket body 2 as shown in FIG. 3. In the placing process, a back face 3b of the sealing body 3 is placed on the step bottom face 12a. The step side face 12b and an outer peripheral side face 3c of the sealing body 3 are butted against each other to form a first butted portion J1. The first butted portion J1 may also include a case where two members are butted against each other to have an approximately V-shaped gap in cross section like this embodiment. Furthermore, the step bottom face 12a overlaps with the back face 3b of the sealing body 3 to form a second butted portion J2.

Figure 4:
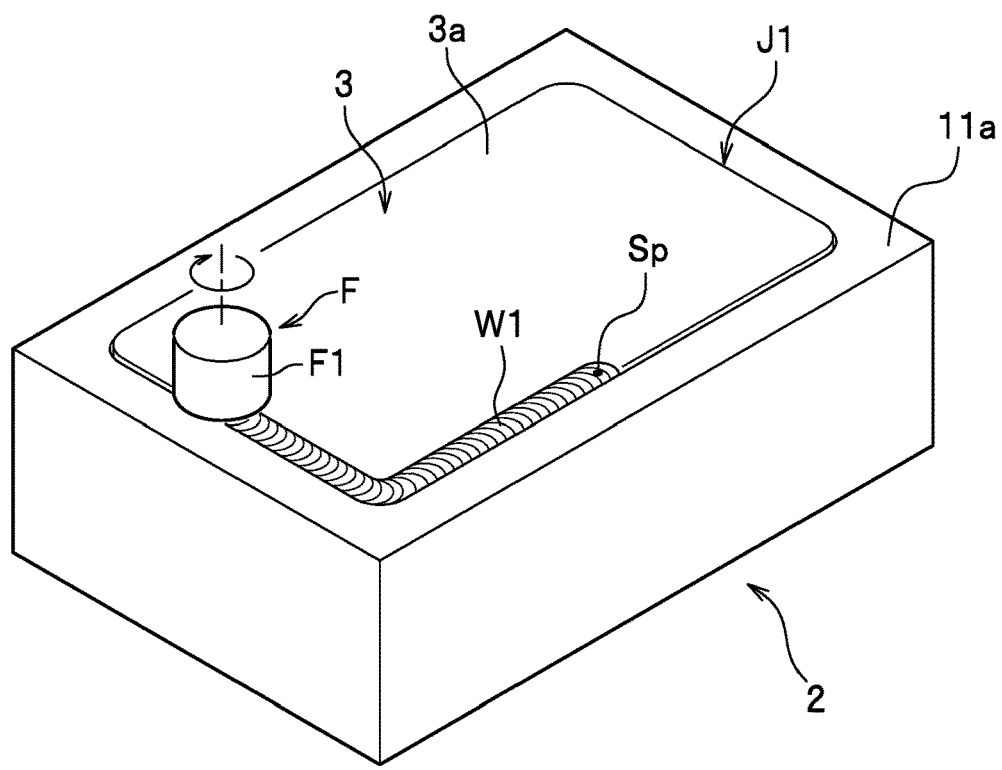
FIG. 4 is a perspective view showing a primary joining process of the method for manufacturing a liquid-cooling jacket according to the first embodiment.
Figure 5:
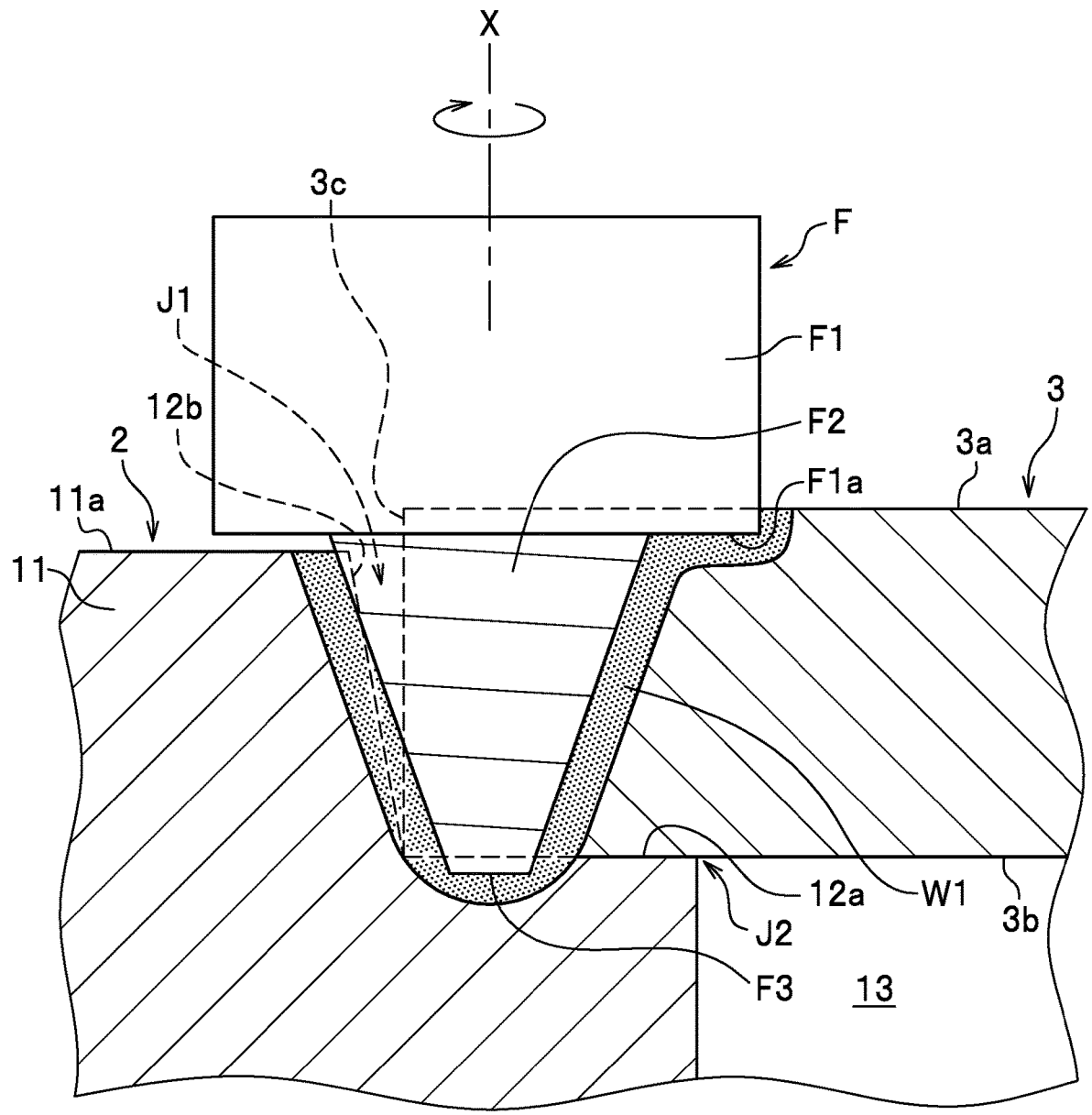
FIG. 5 is a cross sectional view showing the primary joining process of the method for manufacturing a liquid-cooling jacket according to the first embodiment.

As shown in FIGS. 4 and 5, the primary joining process is a process where friction stir welding is performed to the jacket body 2 and the sealing body 3 with use of the rotary tool F being rotated while moving the rotary tool F one round around the sealing body 3.

As shown in FIG. 4, when friction stirring is performed with use of the rotary tool F, the stirring pin F2 being rotated clockwise is inserted in the sealing body 3 and moved in a state that the bottom face F1a of the shoulder portion F1 is in contact with the front face 3a of the sealing body 3. The metal frictionally stirred is hardened, so that a plasticized region W1 is formed at a moving trace of the rotary tool F. In this embodiment, the stirring pin F2 is inserted at a start position Sp set on the sealing body 3 and the rotary tool F is moved clockwise relative to the sealing body 3.

As shown in FIG. 5, in the primary joining process, friction stirring is performed in a state that the rotation axis X of the rotary tool F is parallel to the vertical line (vertical plane). As shown in FIG. 3, the inclination angle β of the step side face 12b is set smaller than the inclination angle α (see FIG. 1) of the outer circumferential face of the stirring pin F2. In the primary joining process, the setting is made so that a lower portion of the outer circumferential face of the stirring pin F2 is not in contact with the step side face 12b of the peripheral wall stepped portion 12 in a state that the bottom face F1a of the shoulder portion F1 is in contact with the front face 3a of the sealing body 3 and an upper portion of the outer circumferential face of the stirring pin F2 is slightly brought in contact with an upper portion of the step side face 12b of the peripheral wall stepped portion 12. The flat face F3 of the stirring pin F2 may be inserted to the same height position as the step bottom face 12a of the peripheral wall stepped portion 12, but in this embodiment, the flat face F3 is inserted to a slightly deeper position than the step bottom face 12a of the peripheral wall stepped portion 12. In the primary joining process, the rotary tool F is made to leave the jacket body 2 and the sealing body 3 after the rotary tool F is moved one round around the sealing body 3 to overlap a beginning and an end of the plasticized region W1.

Figure 6:
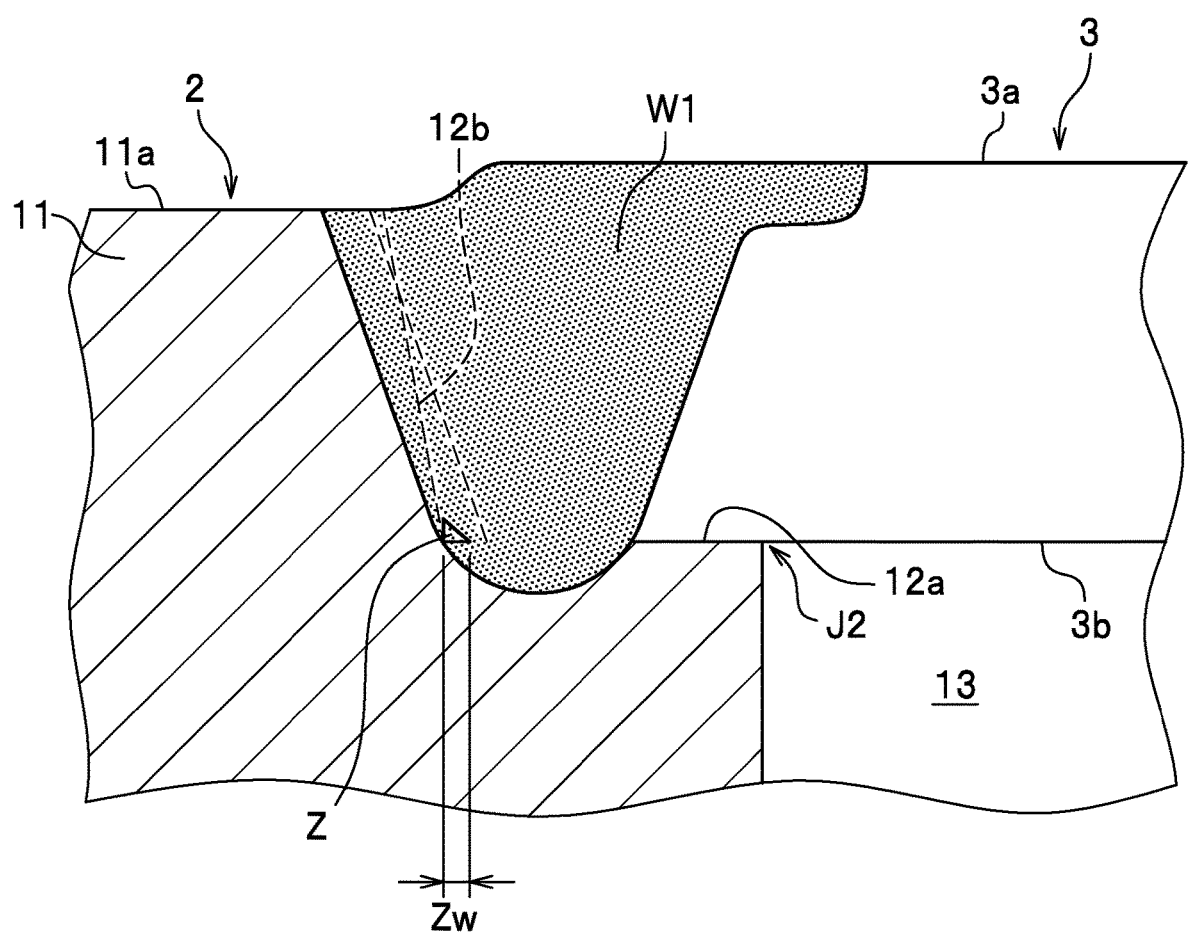
FIG. 6 is a cross sectional view showing the liquid-cooling jacket after the primary joining process of the method for manufacturing a liquid-cooling jacket according to the first embodiment is finished.

As shown in FIG. 6, by the primary joining process, the plasticized region W1 is formed at the moving trace of the rotary tool F and a coarse portion Z is formed at a region which is in the lower portion of the plasticized region W1 and in the vicinity of the inside of the step side face 12b. The coarse portion Z is a region in which the plastically fluidized material has not been sufficiently stirred and the density of the plastically fluidized material is coarser than the other region. The coarse portion Z is formed continuously or intermittently in the length direction of the plasticized region W1.

Figure 7:
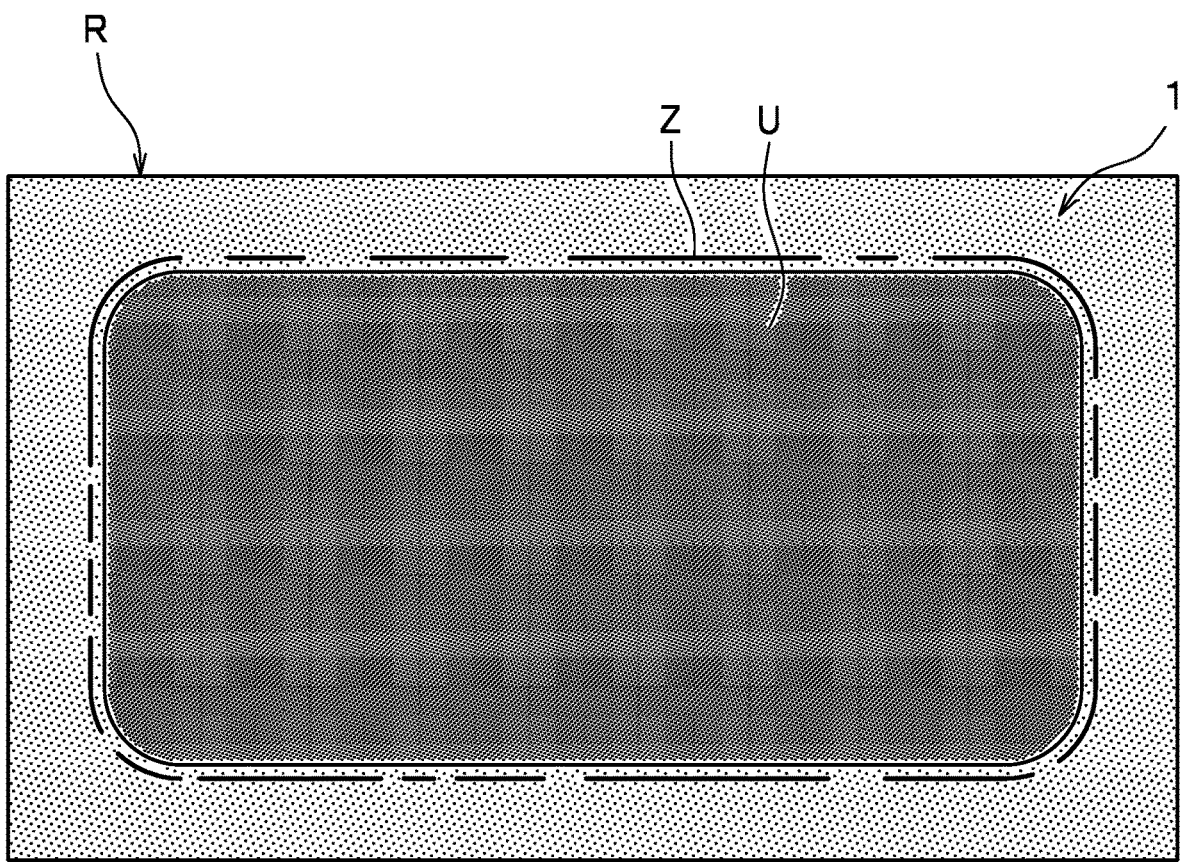
FIG. 7 is a plan view showing an inspection process of the method for manufacturing a liquid-cooling jacket according to the first embodiment.

As shown in FIG. 7, the inspection process is a process to perform a flaw detection for a liquid-cooling jacket 1. In the inspection process, an ultrasonic flaw detection device (for example, ultrasonic imaging device (SAT) manufactured by Hitachi High-Teck GLOBAL) is used. A hollow portion U of the liquid-cooling jacket 1 in an inspection result screen R in FIG. 7 is shown in another color. Further, the coarse portion Z is shown around the hollow portion U in another color and in a frame shape with broken lines. That is, it can be judged that the rotary tool F has passed the entire periphery of the sealing body 3 by displaying the coarse portion Z on the inspection result screen R. The region between the hollow portion U and the coarse portion Z is an area corresponding to the plasticized region W1.

It is preferable that the width Zw of the coarse portion Z is 400 μm or less, more preferably 300 μm or less, and still more preferably 200 μm or less. In a case where the width Zw of the coarse portion Z is more than 400 μm, there is a concern of poor joint strength of the first butted portion J1. In other words, in the case where the width Zw of the coarse portion Z is 400 μm or less, sufficient joint strength is obtained. On the other hand, it is preferable that the width Zw of the coarse portion Z is 100 μm or more. In a case where the width Zw of the coarse portion Z is less than 100 μm, there is a concern that the coarse portion Z is not shown on the inspection result screen R by the ultrasonic flaw detection device.

As shown in FIG. 5, in the primary joining process, the ratio of a region where the outer circumferential face of the stirring pin F2 is in contact with the step side face 12b and the other region where the outer circumferential face of the stirring pin F2 is not in contact with the step side face 12b is about 2:8 in this embodiment. The ratio may be appropriately set in a range where the jacket body 2 and the sealing body 3 are joined together with a desired strength and the coarse portion Z having the above-described predetermined width is formed. In other words, the inclination angle α of the outer circumferential face of the stirring pin F2, the inclination angle β of the step side face 12b of the peripheral wall stepped portion 12, and the position (position in a width direction) of the rotation axis X of the stirring pin F2 may be appropriately set in a range where the jacket body 2 and the sealing body 3 are joined together with a desired strength and the coarse portion Z having the above-described predetermined width is formed.

Figure 8:
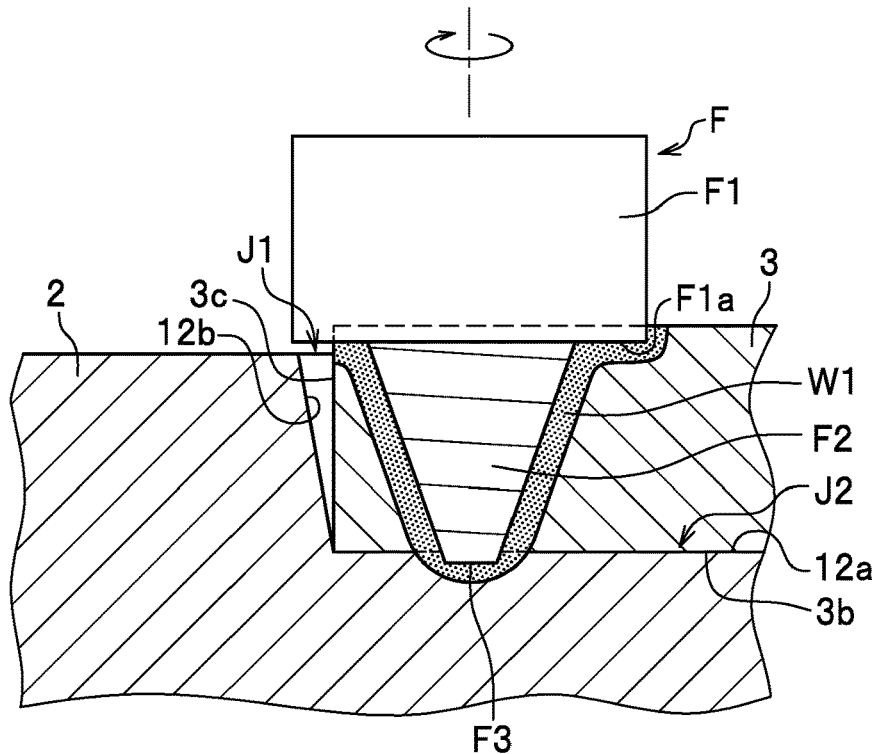
FIG. 8 is a view showing an example that an outer circumferential face of the stirring pin is kept away from a step side face.
Figure 9:
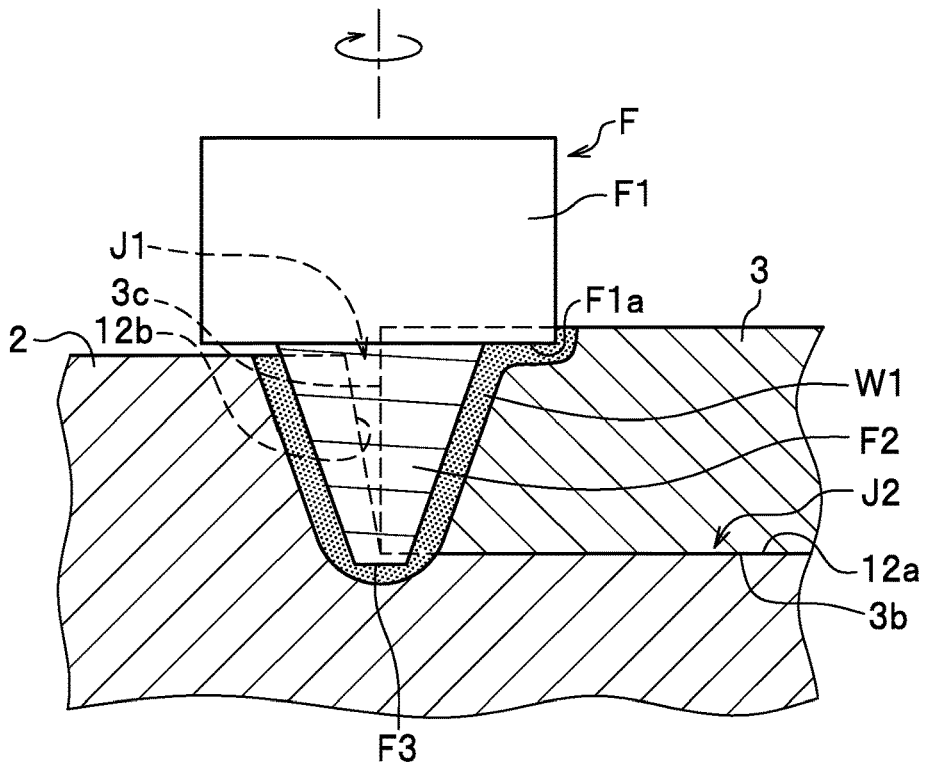
FIG. 9 is a view showing an example that the outer circumferential face of the stirring pin is in contact with the step side face to a large extent.

As shown in FIG. 8, it is preferable that the stirring pin F2 is brought into contact at least with the upper portion of the step side face 12b. This is because if the outer circumferential face of the stirring pin F2 is away from the step side face 12b, the jacket body 2 and the sealing body 3 may not be joined together or the joint strength thereof may be reduced. Further, as shown in FIG. 9, in a case where the contacting margin between the stirring pin F2 and the step side face 12b is larger, more metal of the jacket body 2 having a higher hardness flows toward the sealing body 3 having a lower hardness. Consequently, the stirring balance between the jacket body 2 and the sealing body 3 is poor, so that there is a concern that the joint strength decreases. Furthermore, in the vicinity of the step bottom face 12a, in a case where the outer circumferential face of the stirring pin F2 and the step side face 12b are too close and also in a case where they are too far, it is difficult to form the coarse portion Z having the above-described predetermined width.

According to the method for manufacturing a liquid-cooling jacket according to this embodiment described in the above, the metal of the sealing body 3 at the first butted portion J1 is mainly frictionally stirred to be plastically fluidized because of the frictional heat between the stirring pin F2 and the sealing body 3, so that the step side face 12b and the outer peripheral side face 3c of the sealing body 3 can be joined together at the first butted portion J1. Further, since friction stirring is performed in a state that the bottom face F1a of the shoulder portion F1 is in contact with the front face 3a of the sealing body 3 and the stirring pin F2 is slightly in contact with at least an upper portion of the step side face 12b of the jacket body 2, it is possible to reduce metal mixing from the jacket body 2 to the sealing body 3 as much as possible while ensuring the joint strength. Accordingly, since the metal of the sealing body 3 is mainly frictionally stirred at the first butted portion J1, lowering of the joint strength can be suppressed.

Further, since the stirring pin F2 is inserted to the same depth as the step bottom face 12a or slightly deeper than that, it is possible to reduce metal mixing from the jacket body 2 to the sealing body 3 as much as possible while enhancing the joint strength at the second butted portion J2. Further, since the bottom face F1a of the shoulder portion F1 is in contact with the front face 3a of the sealing body 3, it is possible to suppress an occurrence of burrs. Furthermore, by deliberately forming the coarse portion Z having the predetermined width, the passed position of the stirring pin F2 can be detected by flaw detection. Hereby, quality control work can be more easily performed. Furthermore, by forming the sealing body 3 to have a thickness larger than the step side face 12b, the joined portion can be prevented from falling in metal shortage.

In the primary joining process, a rotational direction and an advancing direction of the rotary tool F may be appropriately set. In this embodiment, the rotational direction and the advancing direction of the rotary tool F have been set so that the jacket body 2 side is an advancing side and the sealing body 3 side is a retreating side within the plasticized region W1 to be formed at the moving trace of the rotary tool F. This enhances the stirring action by the stirring pin F2 around the first butted portion J1, so that rising of the temperature at the first butted portion J1 is expected, and the step side face 12b and the outer peripheral side face 3c of the sealing body 3 can be more firmly joined together at the first butted portion J1.

It should be noted that, an advancing side (Shear side) is a side where the relative speed of the outer periphery of the rotary tool relative to a portion to be joined takes a value that an advancing speed is added to a tangential speed at the outer periphery of the rotary tool. On the other hand, a retreating side (Flow side) is a side where the relative speed of the rotary tool relative to a portion to be joined is lowered since the rotary tool is rotated in the direction opposite to the advancing direction of the rotary tool.

The first aluminum alloy of the jacket body 2 has a hardness harder than the second aluminum alloy of the sealing body 3. This can enhance the endurance of the liquid-cooling jacket 1. Further, it is preferable that the first aluminum alloy of the jacket body 2 is an aluminum alloy casting material and the second aluminum alloy of the sealing body 3 is an aluminum wrought alloy material. In a case where the first aluminum alloy is, for example, the aluminum alloy casting material based on Al—Si—Cu such as JISH5302 ADC12, castability, strength and machinability of the jacket body 2 can be enhanced. Furthermore, in a case where the second aluminum alloy is, for example, a material of JIS A1000 series or A6000 series, processing ability and thermal conductivity can be enhanced.

For example, the thickness of the sealing body 3 is set larger than the height dimension of the step side face 12b in this embodiment, but both may be the same with each other. Further, the step side face 12b may not be inclined and be formed perpendicular to the step bottom face 12a.

In the above embodiment, the method for manufacturing a liquid-cooling jacket that is formed by joining the jacket body and the sealing body has been described as an example, but the present invention is not limited to this specific embodiment. Although not shown in the drawings, the present invention is applicable, without being limited to a specific shape of the liquid-cooling jacket, to friction stir welding performed when a first member having a step portion and a second member to be placed on the step portion are joined together.

Second Embodiment

Figure 10:
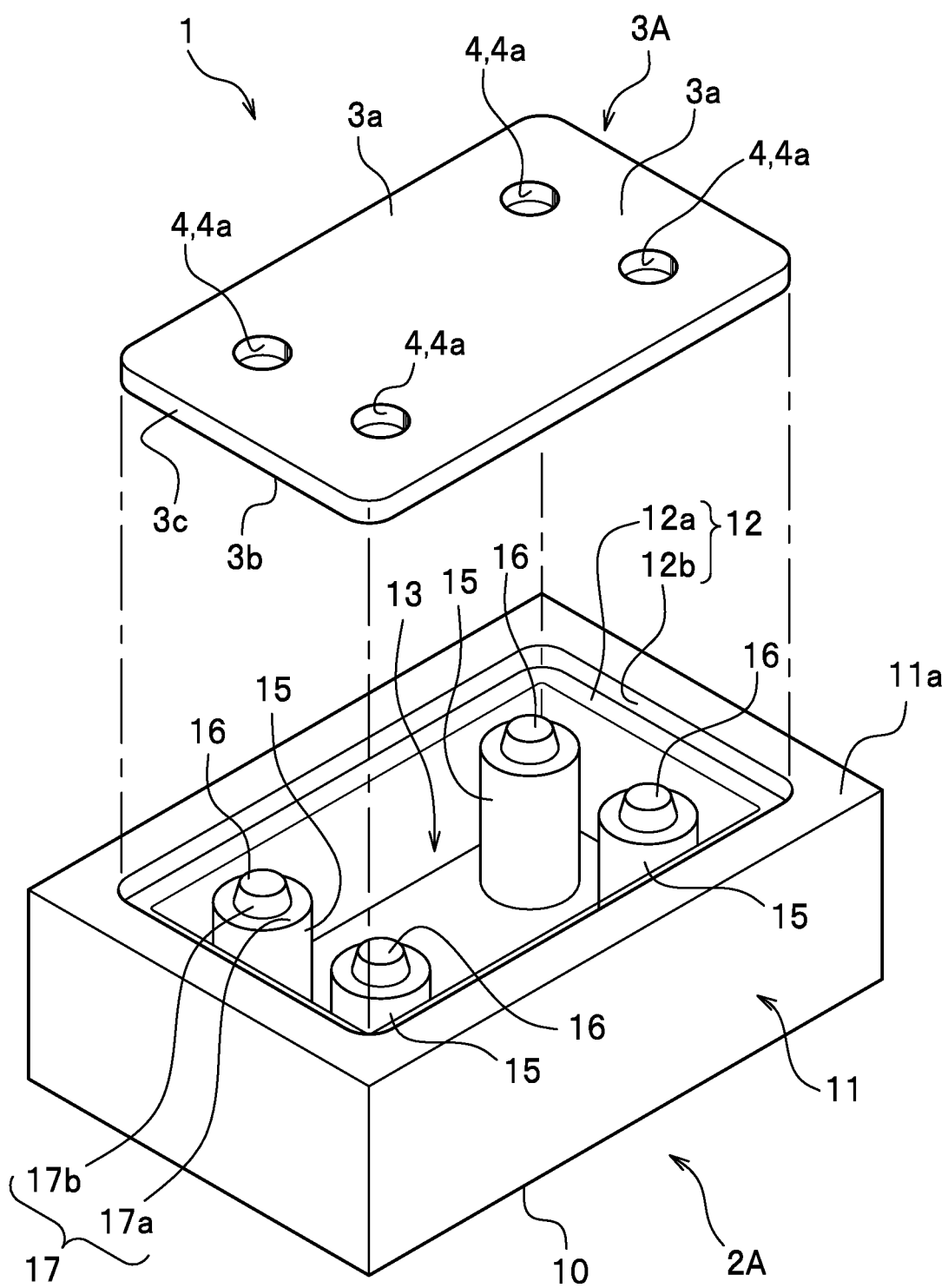
FIG. 10 is a perspective view showing a preparation process of a method for manufacturing a liquid-cooling jacket according to a second embodiment.
Figure 11:
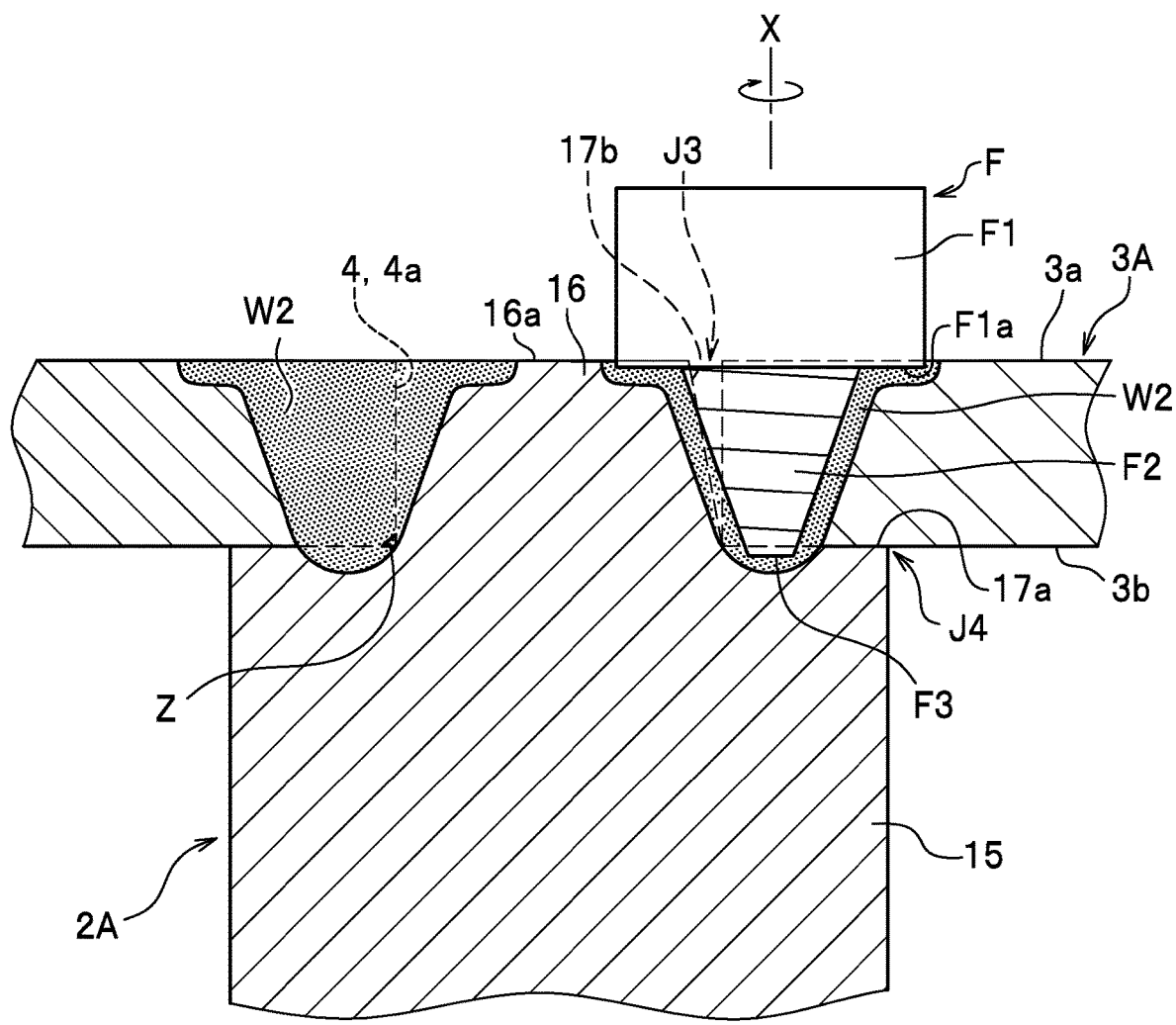
FIG. 11 is a cross sectional view showing a primary joining process of the method for manufacturing a liquid-cooling jacket according to the second embodiment.
Figure 12:
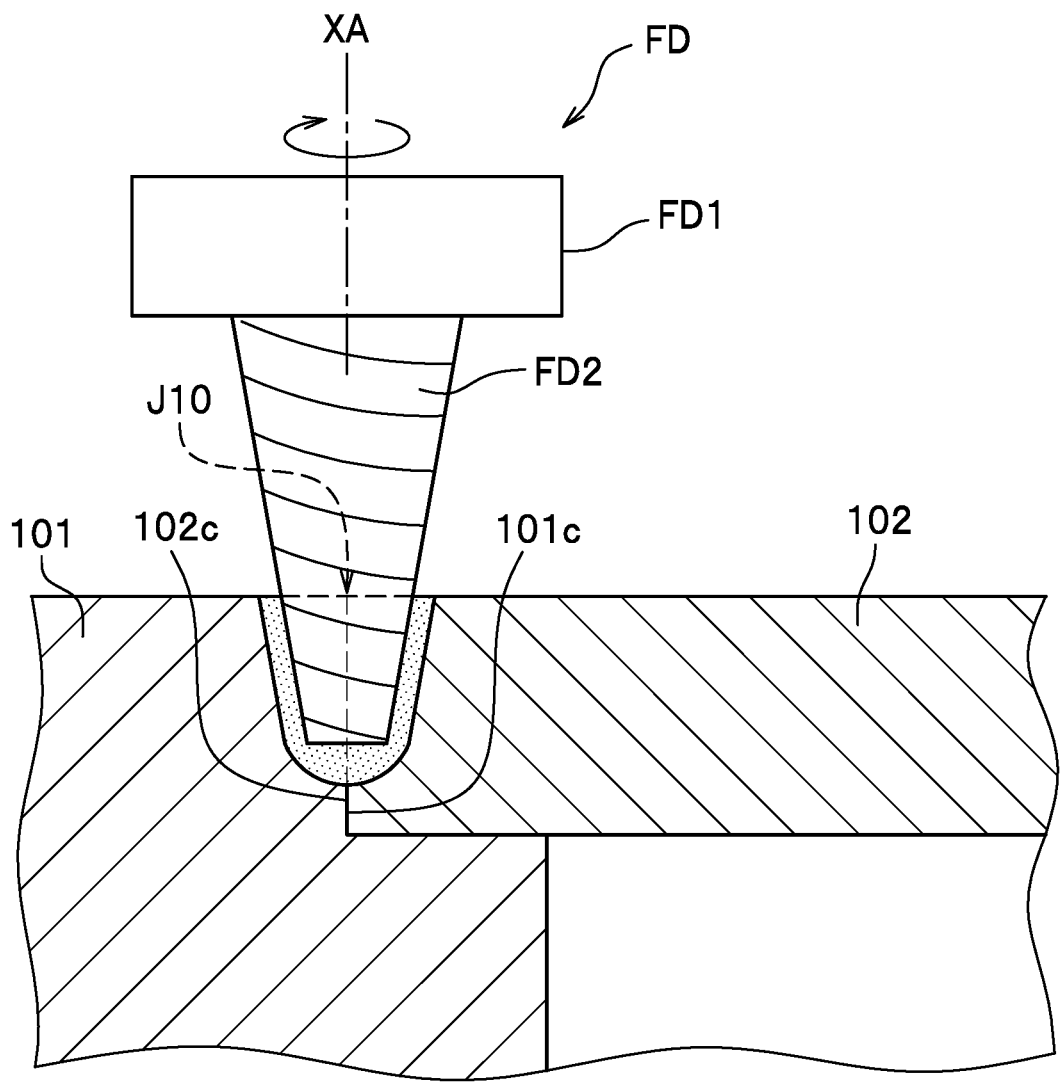
FIG. 12 is a cross sectional view showing a conventional method for manufacturing a liquid-cooling jacket.

Next, a method for manufacturing a liquid-cooling jacket according to a second embodiment of the present invention will be described. As shown in FIGS. 10 and 11, the second embodiment differs from the first embodiment in that columnar supports 15 of a jacket body 2A and a sealing body 3A are joined together. In this embodiment, a preparation process, a placing process, a primary joining process, and an inspection process are performed. The primary joining process includes a first primary joining process and a second primary joining process. In this embodiment, differences from the first embodiment will be mainly described.

In the preparation process, the jacket body 2A and the sealing body 3A are prepared. The jacket body 2A is provided with a bottom portion 10, a peripheral wall portion 11, and a plurality of columnar supports 15 (four columnar supports in this embodiment). Each columnar support 15 rises from the bottom portion 10 and has a columnar shape. Each columnar support 15 is provided with a projection portion 16 tapered to have a smaller diameter with increasing distance toward a tip thereof at the top thereof. Since the projection portion 16 is provided, a columnar support stepped portion 17 is formed on the top side of the columnar support 15. The columnar support stepped portion 17 is composed of a step bottom face 17a and a step side face 17b inclined toward the axis thereof from the step bottom face 17a. The sealing body 3A has hole portions 4 formed at positions corresponding to the columnar supports 15. Each hole portion 4 has such a size that a corresponding projection portion 16 can be inserted therein.

The placing process is a process in which the sealing body 3A is placed on the jacket body 2A. This process forms a first butted portion J1 like the first embodiment. Further, as shown in FIG. 11, the step side face 17b of the columnar support stepped portion 17 and a hole wall 4a of the hole portion 4 are butted against each other to form a third butted portion J3. Furthermore, the step bottom face 17a of the columnar support stepped portion 17 overlaps with a back face 3b of the sealing body 3A to form a fourth butted portion J4.

In the primary joining process, the first primary joining process in which the first butted portion J1 and the second butted portion J2 are joined, and the second primary joining process in which the third butted portion J3 and the fourth butted portion J4 are joined are performed. Description of the first primary joining process is omitted because the first primary joining process is the same as the primary joining process in the first embodiment.

As shown in FIG. 11, in the second primary joining process, an upper portion of the outer circumferential face of the stirring pin F2 is slightly brought in contact with an upper portion of the step side face 17b of the columnar support stepped portion 17 and a lower portion of the outer circumferential face of the stirring pin F2 is not brought in contact with the step side face 17b of the columnar support stepped portion 17. The bottom face F1a of the shoulder portion F1 is kept in contact with the front face 3a of the sealing body 3A and the front face 16a of the projection portion 16. The stirring pin F2 is inserted so that the flat face F3 thereof is located at a position slightly deeper than the step bottom face 17a of the columnar support stepped portion 17.

As shown in FIG. 11, by performing the primary joining process, a plasticized region W2 is formed at a moving trace of the rotary tool F, and the coarse portion Z is formed in the outside vicinity of the step side face 17b in a lower portion of the plasticized region W2. The coarse portion Z is a portion in which the plastically fluidized material is not fully frictionally stirred and thus coarser than the other portions. The coarse portion Z is continuously or intermittently formed in the plasticized region W2. A forming method and forming conditions for the coarse portion Z are the same as that or those in the first embodiment.

This embodiment can attain similar effects to the first embodiment. Further, this embodiment can enhance the joint strength since the columnar supports 15 and the sealing body 3A are joined together. Furthermore, the moving trace of the rotary tool F around the columnar supports 15 can be confirmed in the inspection process by forming the coarse portion Z in the outside vicinity of the base side of each of the projection portions 16 within the plasticized region W2.

REFERENCE SIGNS LIST

1 Liquid-cooling jacket
2 Jacket body (First member)
3 Sealing body (Second member)
F Rotary tool
F1 Shoulder portion
F1a Bottom face
F2 Stirring pin
F3 Flat face
J1 First butted portion
J2 Second butted portion
W1 Plasticized region
Z Coarse portion

The invention claimed is:

1. A method for manufacturing a liquid-cooling jacket, in which a jacket body provided with a bottom portion and a peripheral wall portion rising from a peripheral edge of the bottom portion, and a sealing body to seal an opening portion of the jacket body are friction stir welded,
wherein the jacket body is made of a material harder than the sealing body, wherein a rotary tool used for friction stirring is provided with a shoulder portion and a stirring pin hanging down from a center of a bottom face of the shoulder portion, and wherein an outer circumferential face of the stirring pin is inclined to have a smaller diameter with increasing distance toward a tip thereof, the method comprising:

a preparation process in which a peripheral wall stepped portion having a step bottom face and a step side face is formed along an inner peripheral edge of the peripheral wall portion, the step side face obliquely rising from the step bottom face toward the opening portion to spread, and the sealing body is formed to have a thickness larger than a height dimension of the step side face of the peripheral wall stepped portion;

a placing process in which by placing the sealing body on the jacket body, a first butted portion is formed to have a gap between the step side face of the peripheral wall stepped portion and an outer peripheral side face of the sealing body, and a second butted portion is formed so that the step bottom face overlaps with a back face of the sealing body;

a primary joining process in which a coarse portion is formed in the vicinity of the step side face with a plasticized region, formed at a moving trace of the rotary tool, in a length direction of the plasticized region while the rotary tool is being moved one round along the first butted portion to perform friction stirring in a state that the tip of the stirring pin of the rotary tool being rotated is inserted to the same depth as or deeper than the step bottom face and the bottom face of the shoulder portion is in contact with the sealing body and the stirring pin is in contact with at least an upper portion of the jacket body, wherein the coarse portion is a region in which a plastically fluidized material has not been sufficiently stirred and a density of the plastically fluidized material is coarser than other regions of the plasticized region, and the coarse portion and a width of 100 μm or more and 400 μm or less; and an inspection process in which a passed position of the stirring pin is specified by performing, after the primary joining process, a flaw detection using an ultrasonic flaw detection device to detect the coarse portion.

2. The method for manufacturing a liquid-cooling jacket according to claim 1, wherein the sealing body is made of an aluminum wrought alloy material and the jacket body is made of an aluminum alloy casting material.

3. The method for manufacturing a liquid-cooling jacket according to claim 1, wherein the rotary tool is rotated clockwise in a case where the stirring pin of the rotary tool has a spiral groove in the outer circumferential face thereof, the spiral groove being counterclockwise with increasing distance from a base toward the tip thereof, and wherein the rotary tool is rotated counterclockwise in a case where the stirring pin of the rotary tool has a spiral groove in the outer circumferential face thereof, the spiral groove being clockwise with increasing distance from a base toward the tip thereof.

4. The method for manufacturing a liquid-cooling jacket according to claim 1, wherein in the primary joining process, a rotational direction and an advancing direction of the rotary tool are set so that within the plasticized region, a jacket body side is an advancing side and a sealing body side is a retreating side.

* * * * *